Dec. 4, 1934.   R. R. PITTMAN   1,983,188
PROTECTIVE SYSTEM FOR ELECTRICAL CIRCUITS
Filed July 21, 1933
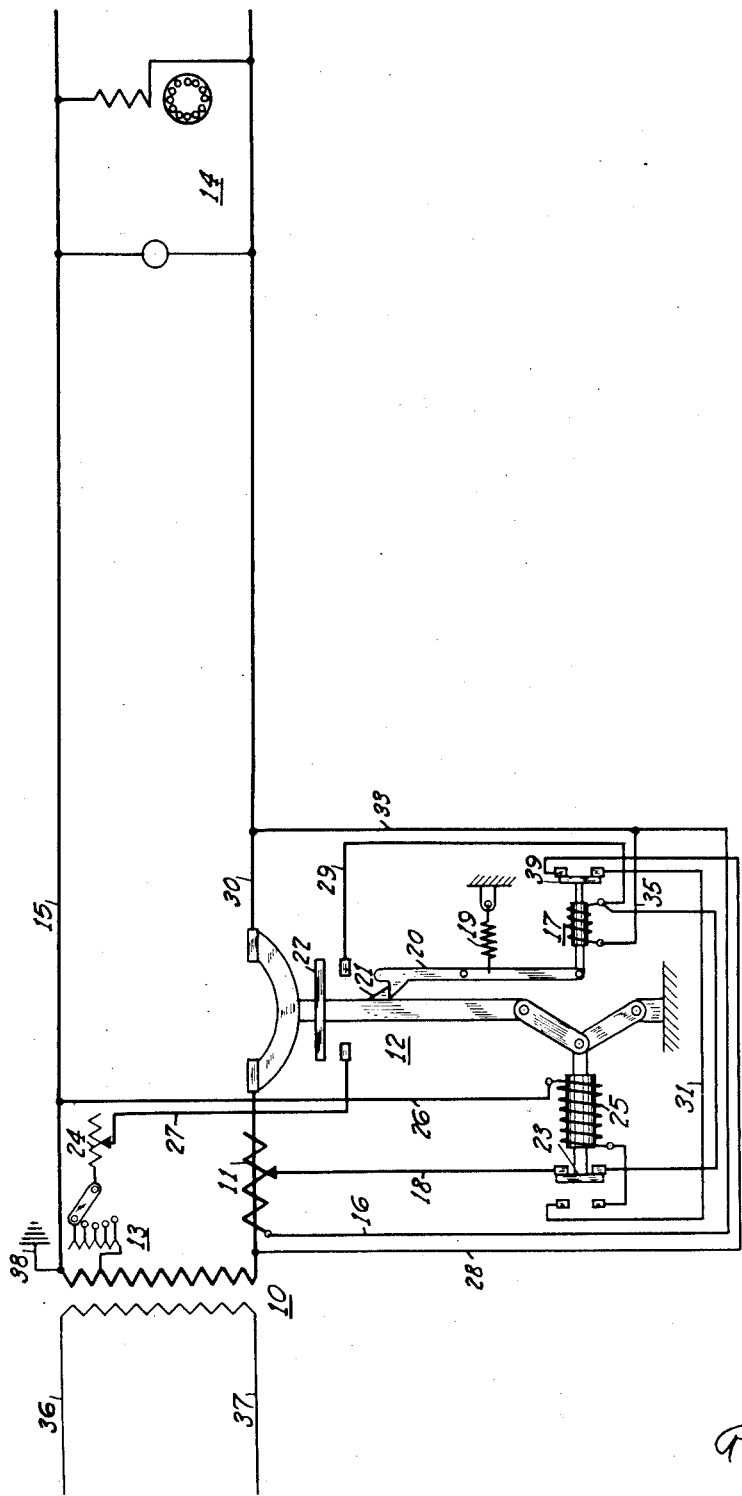
INVENTOR
Ralph R Pittman Patented Dec. 4, 1934

1,983,188

UNITED STATES PATENT OFFICE 1,983,188

PROTECTIVE SYSTEM FOR ELECTRICAL CIRCUITS

Ralph R. Pittman, Pine Bluff, Ark.

Application July 21, 1933, Serial No. 681,533

7 Claims. (Cl. 175—294)

This invention relates generally to systems for the protection of electrical circuits and connected apparatus, and particularly to systems arranged for supplying electrical power at utilization voltages, commonly called secondary or low tension distribution voltages. Such voltages are usually supplied by distribution transformers energized by alternating current, the low tension winding of the transformers being grounded in order to limit the voltage-to-ground of the conductors.

An object of the present invention is to provide a protective system for the above-described circuits wherein the circuit, under normal circuit conditions, is energized at a normal utilization voltage, and under abnormal circuit conditions, is energized at a lower-than-normal testing voltage. It will be seen that such a system differs in many respects from those reclosing systems in which the circuit is energized regardless of its condition.

A further object is the provision of means for impressing a low voltage on the connected circuit upon the occurrence of a predetermined electrical condition, and limiting the current due to such voltage to a sufficiently low value to prevent thermal damage to the transformer or circuit conductors.

A further object is the provision of means for limiting the magnitude of such voltage to a sufficiently low value to render it harmless to human life from the effects of electrical shock.

Additional objects and advantages will appear from the following specific description and drawing describing a particular embodiment of the invention.

In the drawing:

Figure 1 is a diagrammatic representation of an embodiment of the invention applied to a commonly used secondary electrical distribution circuit.

Referring now in particular to the drawing, 10 represents a distribution transformer, the primary winding being energized through the conductors 36 and 37 from some suitable source of alternating current power. In accordance with the present usual practice, one end of the secondary winding of the transformer 10 is connected to and maintained at substantially ground potential by the conductor 38. The respective ends of the secondary of the transformer 10 are under normal circuit conditions, connected to a load 14, by means of the secondary conductors 15 and 30, and the circuit-breaker 12.

Assuming now that an overload condition occurs on the circuit represented by the conductors 15 and 30, this condition is immediately reflected in the trip coil of the tripping mechanism 17 through the adjustable current transformer 11, and the connecting conductors 16, 35 and 18. The increase in current in the coil of the tripping mechanism 17 causes the trip lever 20 to rotate in a clockwise direction against the bias of the spring 19, in this manner disengaging the circuit-breaker 12 and allowing the latter to drop to the open position. It will now be apparent that the circuit represented by the conductors 15 and 30 is energized at a reduced voltage from the transformer tap 13, through the impedance 24, the conductor 27, the auxiliary switch bar 22, the conductor 29, the trip coil of the tripping mechanism 17, the conductor 35 and the conductor 33. It will also be apparent that, unless the current is below the value necessary to overcome the bias of the spring 19, the shunting bar 39 will remain disengaged from its cooperating contacts. Under these conditions, therefore, the circuit-breaker 12 remains in the open position, and the circuit remains energized at the reduced voltage as long as the overload circuit condition persists.

I will now explain the operation of the system upon the removal of the assumed overload condition. This condition is immediately reflected in the coil of the tripping mechanism 17, allowing the bias of the spring 19 in a counter-clockwise direction to exceed the pull of the coil in a clockwise direction, and causing the shunting bar 39 to engage its cooperating contacts. The circuit-breaker closing coil 25 is thus energized from the transformer 10 through the conductor 26, the coil 25, the switch 23, the conductor 31, the switch 39 and the conductor 28. The circuit-breaker 12 is in this manner caused to re-close, and the closing coil 25 disconnected from the transformer 10 by the disengagement of the switch bar 23 from its cooperating contacts. The circuit-breaker 12 remains latched in the closed position by the bias of the spring 19 on the latch member 20 unless the bias of the spring 19 is again overcome by the pull of the coil of the tripping mechanism 17, in which case the operation above described is repeated.

The position of the circuit-breaker 12 (whether open or closed) is thus controlled by the circuit condition at all times through the operation of the tripping mechanism 17 under the influence of the coil embodied therein. The use of the protective system effectively prevents the closing of the circuit-breaker under short-circuit conditions, and thus avoids the system disturbance and contact burning present in systems which permit the reclosure of the breaker at definite intervals of time without regard for the connected circuit conditions.

It will be apparent that in case conductors 15 and 30 were in physical contact, the impedance of the circuit might be sufficiently low to permit excessive current in the portion of the transformer winding used to supply the reduced voltage. It is for this reason that the current limiting impedance 24 is provided.

While in this embodiment of my invention I have illustrated a magnetic device in connection with the tripping mechanism, it will be apparent to those skilled in the art that other devices responsive to the electrical condition of a circuit may be readily used, and that under certain conditions, a thermal element may be more suitable than the magnetic device herein shown.

The embodiment here shown illustrates a two-wire secondary, one wire of which is, in accordance with common practice, at substantially ground potential. It is of course apparent that the system herein disclosed may be readily used on systems requiring 3, 4 or more secondary conductors.

Since under abnormal circuit conditions, the conductors are energized at a circuit-testing voltage in order to determine the condition of the circuit the magnitude of the circuit-testing voltage is important, for the reason that an abnormal condition may be due to broken or fallen conductors which are accessible to the public. The potential difference between any conductor and ground must be sufficiently low to be harmless to human life, and in accordance with general knowledge on this subject, this potential difference should not exceed 50 effective volts on a 60 cycle alternating current system. It is of course desirable to use the minimum voltage required to satisfactorily operate the system, and voltages of the order of 10 to 30 volts are adequate for the purpose. The tap arrangement 13 is provided for setting the circuit-testing voltage at the desired value.

As an example of the practical application of this invention, assume that a 10 kva transformer, having a secondary utilization voltage of 125, is connected to a load circuit in accordance with the system herein disclosed, and that it is desired, for the protection of the transformer and the circuit, to limit the current delivered to the circuit to the full load rating of the transformer; in this particular case, 80 amperes. Under these conditions, load may be added until the impedance of the load circuit is reduced to 1.56 ohms. The actuating coil of the tripping mechanism 17 is conveniently arranged to trip the circuit-breaker 12 upon the passage of any current in excess of 5 amperes through the coil, and the ratio of the current transformer 11 is therefore 80 to 5, or 16 to 1. Upon the occurrence of an overload, the impedance of the load circuit is reduced below 1.56 ohms, permitting a current in excess of 80 amperes in the conductor 30, and therefore in excess of 5 amperes in the coil of the tripping mechanism 17, causing the breaker 12 to move to the open position as above described. It is desired that the breaker remain in this position until the load is reduced to a point corresponding to an impedance of 1.56 ohms, and the test-voltage required is that necessary to cause a current of 5 amperes through the current limiting impedance 24 and the load impedance in series arrangement with the remainder of the circuit.

Since the purpose of the current-limiting impedance 24 is to prevent the passage of excessive current in the test circuit upon the occurrence of a short-circuit condition involving conductors 30 and 15, its value may conveniently be made equal to the full-load impedance, or 1.56 ohms. This value added to the load impedance, and neglecting the relatively low impedance of the other portions of the circuit, results in a total testing-circuit impedance of 3.12 ohms. Since the current under normal conditions must be limited to 5 amperes through the coil of the tripping mechanism 17, the testing-voltage required is 5 times 3.12, or 15.6 volts. This voltage remains impressed upon the load circuit unless and until the load impedance is increased above 1.56 ohms, at which time the spring 19 overcomes the pull of the coil of the tripping mechanism 17, and the circuit is re-energized at the normal utilization voltage; in this case 125 volts.

It is obvious that the circuit-testing voltage in this case (15.6 volts) is not dangerous to human life, in case the overload condition was caused by conductors falling in locations accessible to the public. At the same time it is pointed out that 125 volts may, under certain conditions, cause electrical shocks which are fatal to human life.

Among the advantages of this system over those heretofore employed are (1) no timing devices are required, since the position of the circuit-breaker depends only on the condition of the connected circuit (2) the circuit-breaker can not be closed on a short-circuit (3) the circuit-testing voltage is sufficiently low to be harmless to human life from the effects of electrical shock (4) energy is restored to the circuit whenever the circuit is in proper condition to be energized and (5) the arrangement is simple and inexpensive in comparison to present reclosing systems.

While I have herein described one embodiment of my invention, many others will be obvious to those skilled in this art from my description. I am fully aware that many modifications of the embodiments shown herein are possible, and my invention is not to be limited except as is necessitated by the prior art and the spirit of the appended claims.

I claim as my invention:

1. A protective system for an electrical circuit comprising a circuit-breaker arranged to energize said circuit from the low tension winding of a transformer at a normal potential difference to ground, a closing coil associated with said circuit-breaker, a tap on said low tension winding between the ends thereof, means including a current responsive element for opening said circuit-breaker in response to the occurrence of an excess-current condition in said circuit, switch means responsive to an opening movement of said circuit-breaker for connecting said circuit to said tap in series circuit relation with said current responsive element and a portion of said low tension winding, and means dependent upon the current in said current responsive element for energizing said closing coil.

2. A protective system for a load circuit comprising a circuit-breaker arranged to connect said circuit to the low tension terminals of a transformer, a closing coil associated with said circuit-breaker means including a current responsive element for opening said circuit-breaker in response to the occurrence of a predetermined current in said load circuit, a current limiting impedance means including an auxiliary switch actuated by an opening movement of said circuit-breaker for establishing a series circuit in which said current limiting impedance, said transformer, said current responsive element and said load circuit are electrically connected in series circuit relation, and means dependent upon the current in said current responsive element for energizing said closing coil.

3. A protective system for a load circuit comprising a circuit-breaker having a closing coil and a movable member, said circuit-breaker being arranged to normally connect said load circuit to the terminals of a low tension winding of a transformer, and actuating means including a current responsive element for opening said circuit-breaker in response to the occurrence of a predetermined current in said load circuit, switch means carried by the said movable member of said circuit-breaker for establishing, in response to the opening movement of said circuit-beaker, a series circuit in which said transformer, said current responsive element and said load circuit are electrically connected in series circuit relation, and means dependent upon the current in said current responsive element for energizing said closing coil whereby said circuit breaker is reclosed.

4. A protective system for a load circuit comprising a voltage transformer arranged to supply a normal voltage and a circuit-testing voltage, a circuit-breaker arranged to normally energize said circuit at said normal voltage and electro-responsive means associated with said circuit-breaker depending upon the occurrence of an overload on said circuit for energizing said circuit at said circuit-testing voltage, and upon the removal of said overload for energizing said circuit at said normal voltage, said electro-responsive means including a closing coil for said circuit-breaker, a current transformer in said circuit, a current responsive element electrically connected to said current transformer under normal load conditions, means responsive to an overload condition on said circuit for disconnecting said current responsive element from said current transformer and electrically connecting said current responsive element in series circuit relation with a series circuit including said voltage transformer and said load circuit, and means dependent upon the current in said current responsive element for energizing said closing coil.

5. A protective system comprising a voltage transformer having a low tension winding interposed between a source of power and a load circuit, said load circuit including a first load conductor and a second load conductor extending from said low tension winding for connecting a load, means for maintaining said first conductor at substantially ground potential, a main switch interposed in said second conductor, a latch mechanism including a trip coil associated with said main switch for maintaining said switch in closed position under normal load circuit conditions, a current transformer interposed in said second conductor between said voltage transformer and said main switch, means for electrically connecting said current transformer to said trip coil whereby said main switch is unlatched upon the occurrence of an overload on said load circuit, means including an auxiliary switch arranged to be closed upon the unlatching of said main switch for energizing said load circuit through said trip coil from said voltage transformer, a closing coil associated with said main switch for closing said switch, and means dependent upon the current in said trip coil for energizing said closing coil.

6. A protective system for an electrical circuit comprising a transformer having a low tension winding interposed between a source of power and a load circuit, said load circuit including a first load conductor and a second load conductor extending from the respective ends of said low tension winding for connecting a load, a third conductor extending from an intermediate tap on said low tension winding, means for maintaining said first conductor at substantially ground potential, a main switch interposed in said second conductor, a latch mechanism including a current responsive control element associated with said main switch for maintaining said switch in closed position under normal load conditions and unlatching said main switch under overload conditions, a current responsive transformer means interposed in said second conductor between said transformer and said main switch, means for electrically connecting said current responsive transformer means to said control element whereby said main switch is unlatched and opened upon the occurrence of an overload on said load circuit, means including an auxiliary switch arranged to be closed by an opening movement of said main switch for energizing said load circuit through a series circuit comprising said control element and said second conductor from said third conductor of said low tension winding, a current limiting impedance interposed between said third conductor and said auxiliary switch, magnetic means associated with said main switch for closing said switch, and means dependent upon the current in said control element for energizing said magnetic means.

7. A protective system for an electrical circuit comprising a transformer having a low tension winding interposed between a source of power and a load circuit, said load circuit including a first load conductor and a second load conductor extending from the respective ends of said low tension winding for connecting a load, a third conductor extending from an intermediate tap on said low tension winding, means for maintaining said first conductor at substantially ground potential, a normally closed main switch interposed in said second conductor, a latch mechanism including a control element associated with said main switch for maintaining said switch in closed position under normal load conditions and unlatching said main switch under overload conditions, means including a normally open auxiliary switch arranged to be closed by an opening movement of said main switch for energizing said load circuit through a series circuit comprising said control element and said second conductor from said third conductor of said low tension winding, a current limiting impedance interposed between said third conductor and said auxiliary switch, magnetic means associated with said main switch for closing said main switch, and means dependent upon the current in said control element for energizing said magnetic means.

RALPH R. PITTMAN.